(12) United States Patent
Kung et al.

(10) Patent No.: US 10,101,724 B2
(45) Date of Patent: Oct. 16, 2018

(54) LASER MACHINING ROBOT

(71) Applicant: Panasonic Intellectual Property Management Co., Ltd., Osaka (JP)

(72) Inventors: Yiheng Kung, Osaka (JP); Yasushi Mukai, Osaka (JP); Wataru Takahashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/023,686

(22) PCT Filed: Mar. 12, 2015

(86) PCT No.: PCT/JP2015/001380
§ 371 (c)(1),
(2) Date: Mar. 22, 2016

(87) PCT Pub. No.: WO2015/141196
PCT Pub. Date: Sep. 24, 2015

(65) Prior Publication Data
US 2017/0083001 A1    Mar. 23, 2017

(30) Foreign Application Priority Data

Mar. 17, 2014   (JP) ................. 2014-053071

(51) Int. Cl.
*G05B 19/402*   (2006.01)
*B23K 26/08*    (2014.01)
*B25J 19/00*    (2006.01)

(52) U.S. Cl.
CPC ........ *G05B 19/402* (2013.01); *B23K 26/0884* (2013.01); *B25J 19/0029* (2013.01); *G05B 2219/36199* (2013.01); *Y10S 901/41* (2013.01)

(58) Field of Classification Search
CPC ............ B23K 26/0884; B25J 19/0029; G05B 19/402; G05B 2219/36199; Y10S 901/41
(Continued)

(56) References Cited

U.S. PATENT DOCUMENTS 5,466,909 A    11/1995  Nihei et al.
6,120,976 A    9/2000   Treadwell et al.
(Continued)

FOREIGN PATENT DOCUMENTS

CN    1781647      6/2006
CN    103568023    2/2014
(Continued)

OTHER PUBLICATIONS

The Extended European Search Report dated Sep. 26, 2016 for the related European Patent Application No. 15765377.5.
(Continued)

*Primary Examiner* — Kenneth M Lo
*Assistant Examiner* — Chad Erdman
(74) *Attorney, Agent, or Firm* — Wenderoth, Lind & Ponack, L.L.P.

(57) ABSTRACT

A laser machining robot includes a manipulator, a robot controller, and a laser machining head. The robot controller controls the operation of the manipulator. The laser machining head is mounted to the manipulator and scans a laser beam. The laser machining head includes a servomotor for driving a member for scanning the laser beam. The drive of the servomotor is controlled by the robot controller.

11 Claims, 5 Drawing Sheets

(58) Field of Classification Search
USPC .......................................................... 700/245
See application file for complete search history.

(56) References Cited

U.S. PATENT DOCUMENTS

| | | | | |
|---|---|---|---|---|
| 6,288,512 | B1* | 9/2001 | Berninger | B25J 19/0025 |
| | | | | 191/12 R |
| 9,484,148 | B1* | 11/2016 | Reid | H01F 38/14 |
| 2004/0052630 | A1* | 3/2004 | Nihei | B25J 13/085 |
| | | | | 414/730 |
| 2004/0094728 | A1 | 5/2004 | Herzog et al. | |
| 2004/0111185 | A1 | 6/2004 | Gmeiner | |
| 2005/0244260 | A1* | 11/2005 | Deplano | B25J 19/005 |
| | | | | 414/730 |
| 2006/0113392 | A1 | 6/2006 | Otsuka et al. | |
| 2006/0294628 | A1 | 12/2006 | Iwai et al. | |
| 2007/0248448 | A1* | 10/2007 | Starz | B65G 61/00 |
| | | | | 414/788 |
| 2010/0101358 | A1* | 4/2010 | Sendai | B25J 19/0029 |
| | | | | 74/490.06 |
| 2012/0111135 | A1 | 5/2012 | Ichibangase et al. | |
| 2014/0020498 | A1 | 1/2014 | Adachi | |
| 2015/0027261 | A1* | 1/2015 | Okahisa | B25J 18/04 |
| | | | | 74/490.02 |
| 2015/0207368 | A1* | 7/2015 | Chen | H02K 1/185 |
| | | | | 310/83 |
| 2016/0202045 | A1* | 7/2016 | Schonleber | G01B 9/02019 |
| | | | | 356/497 |

FOREIGN PATENT DOCUMENTS

| | | | | |
|---|---|---|---|---|
| EP | 1424613 | 6/2004 | | |
| EP | 1661657 | 5/2006 | | |
| JP | 62-044394 | 2/1987 | | |
| JP | 2-256491 | 10/1990 | | |
| JP | 5-212570 | 8/1993 | | |
| JP | 5-245685 | 9/1993 | | |
| JP | 6-179092 | 6/1994 | | |
| JP | 11-156569 | 6/1999 | | |
| JP | 2002-530205 | 9/2002 | | |
| JP | 2012-096332 | 5/2012 | | |
| JP | 2014-018929 | 2/2014 | | |
| JP | 2014083592 A | * | 5/2014 | B23K 26/064 |
| WO | 1985/001496 | 4/1985 | | |
| WO | 2006/112059 | 10/2006 | | |

OTHER PUBLICATIONS

International Search Report of PCT application No. PCT/JP2015/001380 dated Jun. 9, 2015.
English Translation of Search Report dated Apr. 18, 2018 in Chinese Application No. 201580002010.1.

* cited by examiner

LASER MACHINING ROBOT

TECHNICAL FIELD

The present disclosure relates to a laser machining robot that has a laser machining head and a manipulator.

BACKGROUND ART

Patent Literature 1 describes a spot welding robot having a spot welding gun at the tip thereof. A first filament body and a second filament body are wired to the spot welding robot. As the first filament body, a power cable, a power supply line, and a signal line connected to a servomotor for driving the joint axis of the spot welding robot are grouped. As the second filament body, a power cable, a power supply line, and a signal line connected to the servomotor for driving the joint axis of the spot welding robot, and a welding power supply line connected to the spot welding gun, a cooling hose, a power supply line, and a signal line are grouped.

The first filament body and the second filament body are connected from the connection hole in the base of the spot welding robot via the inside of the base, the side of the arm, and the inside of the arm, to the servomotor and the spot welding gun of the spot welding robot.

Citation List

Patent Literature

PTL1: Japanese Patent Unexamined Publication No. 2012-096332

SUMMARY OF THE INVENTION

In the conventional spot welding robot, the wiring of a first filament body and the wiring of a second filament body need to be connected to a welding controller for controlling a spot welding gun and a robot controller for controlling the spot welding robot separately. For this purpose, control cables need to be disposed in the welding controller and the robot controller separately from the spot welding robot. These cables can interfere with peripheral devices.

The present disclosure provides a laser machining robot in which interference of cables used in the laser machining robot with the peripheral devices is reduced.

In order to address the above problem, the laser machining robot of the present disclosure includes a manipulator, a robot controller, and a laser machining head. The robot controller controls the operation of the manipulator. The laser machining head is mounted to the manipulator and scans a laser beam. The laser machining head includes a servomotor for driving the member for scanning the laser beam. The drive of the servomotor is controlled by the robot controller.

A laser machining robot of the present disclosure can reduce the number of cables disposed between the manipulator and the robot controller, so that the interference of the cables disposed in the laser machining robot with peripheral devices can be reduced.

DESCRIPTION OF EMBODIMENT

Exemplary Embodiment

Figure 1:
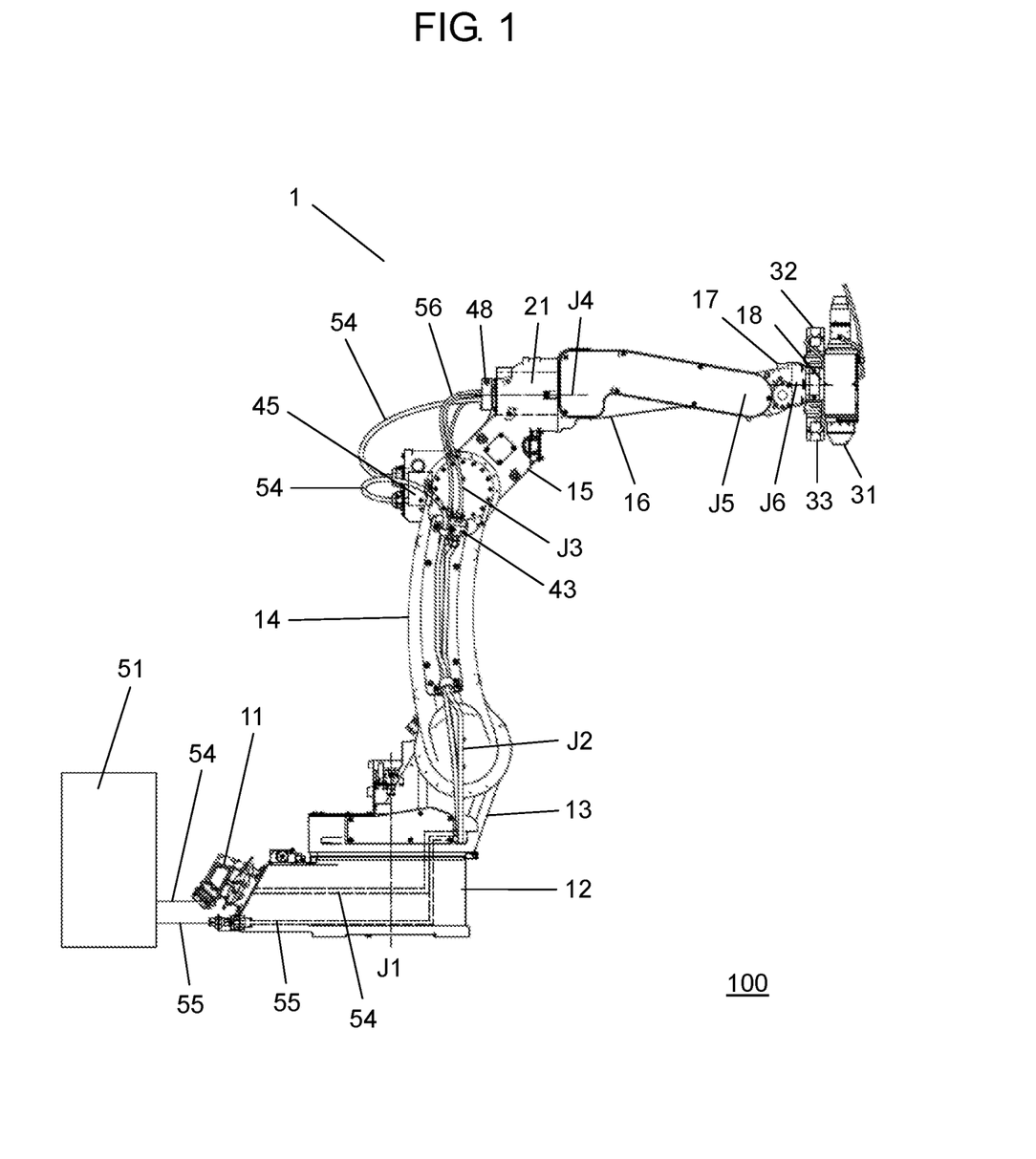
FIG. 1 is a right side view of a laser machining robot that includes a manipulator, a robot controller, and a laser machining head in accordance with an exemplary embodiment.
Figure 2:
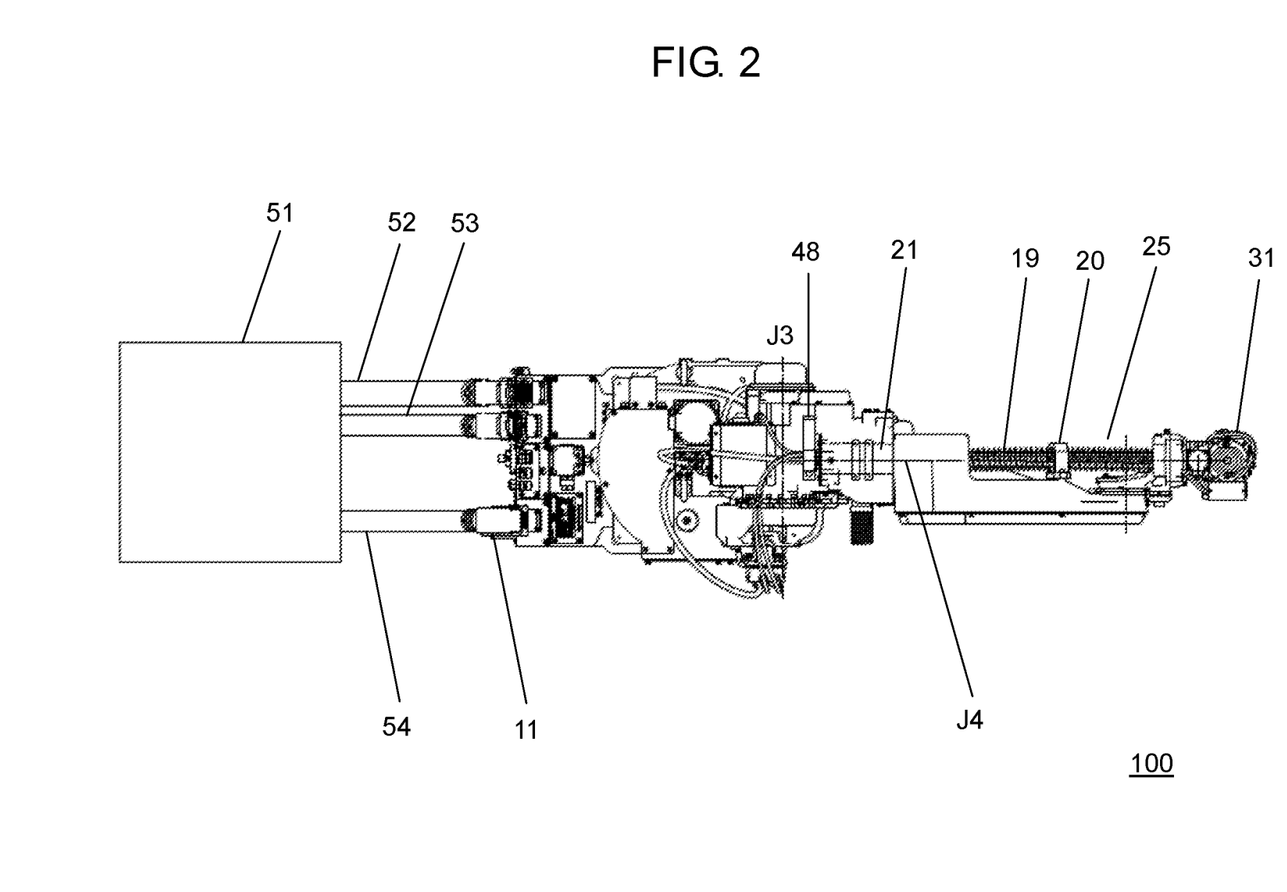
FIG. 2 is a top view of the laser machining robot that includes the manipulator, the robot controller, and the laser machining head in accordance with the exemplary embodiment.
Figure 3:
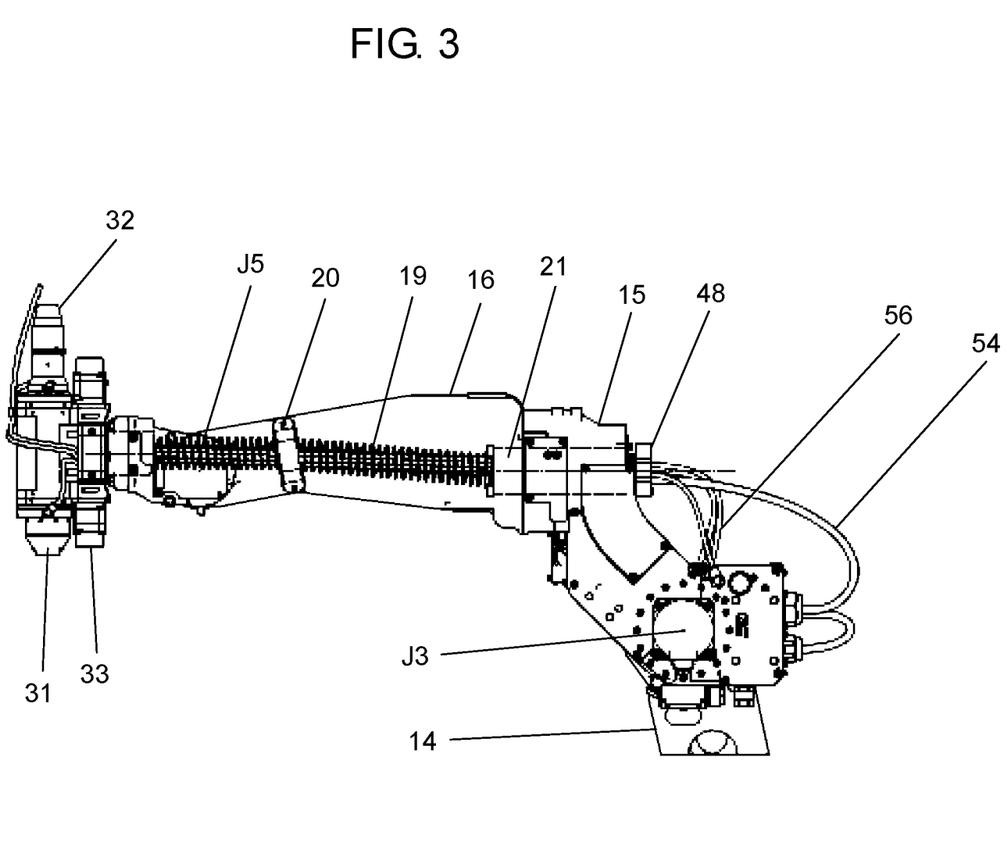
FIG. 3 is a left side view of a wrist of the manipulator in a state where the laser machining head is mounted in accordance with the exemplary embodiment.
Figure 4:
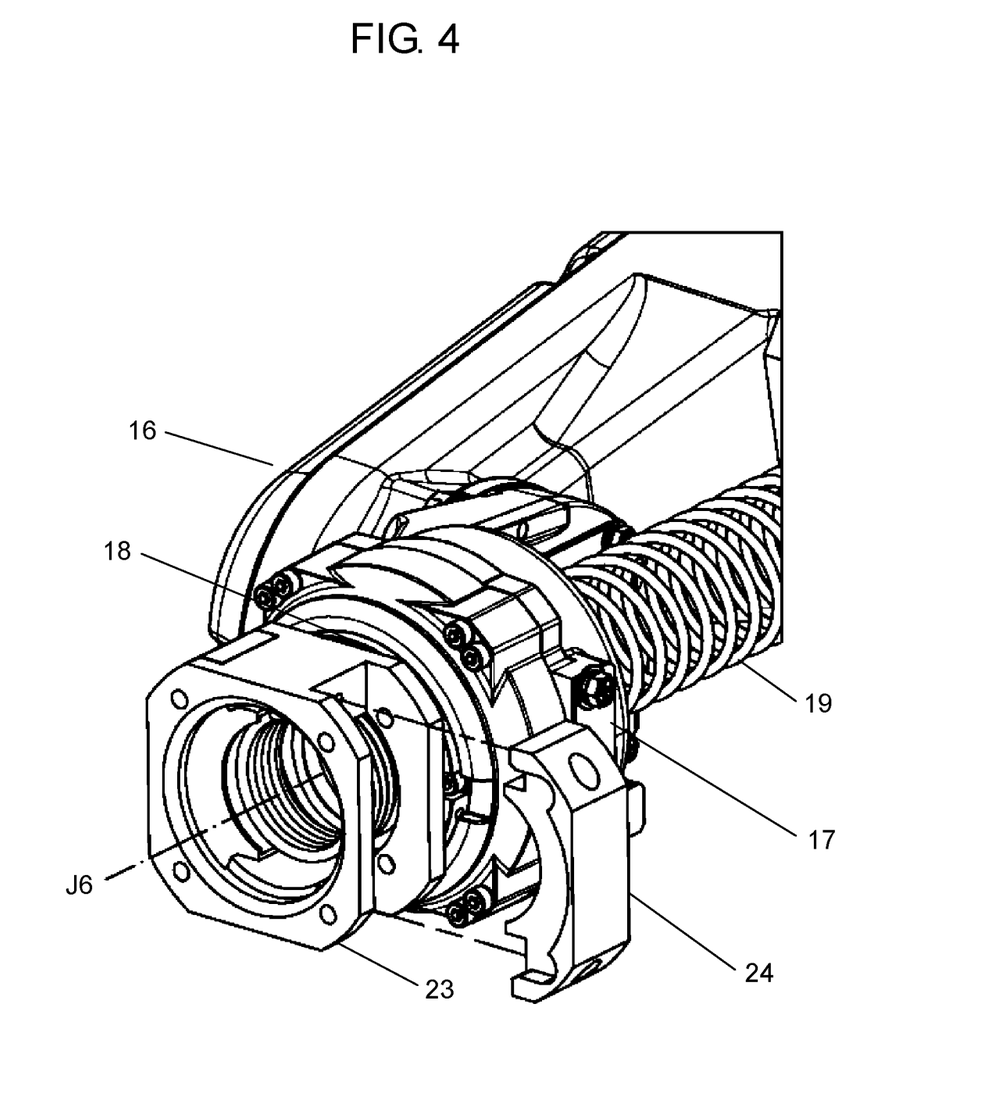
FIG. 4 is a perspective view showing a tip of the wrist of the manipulator in a state where the laser machining head is not mounted in accordance with the exemplary embodiment.
Figure 5:
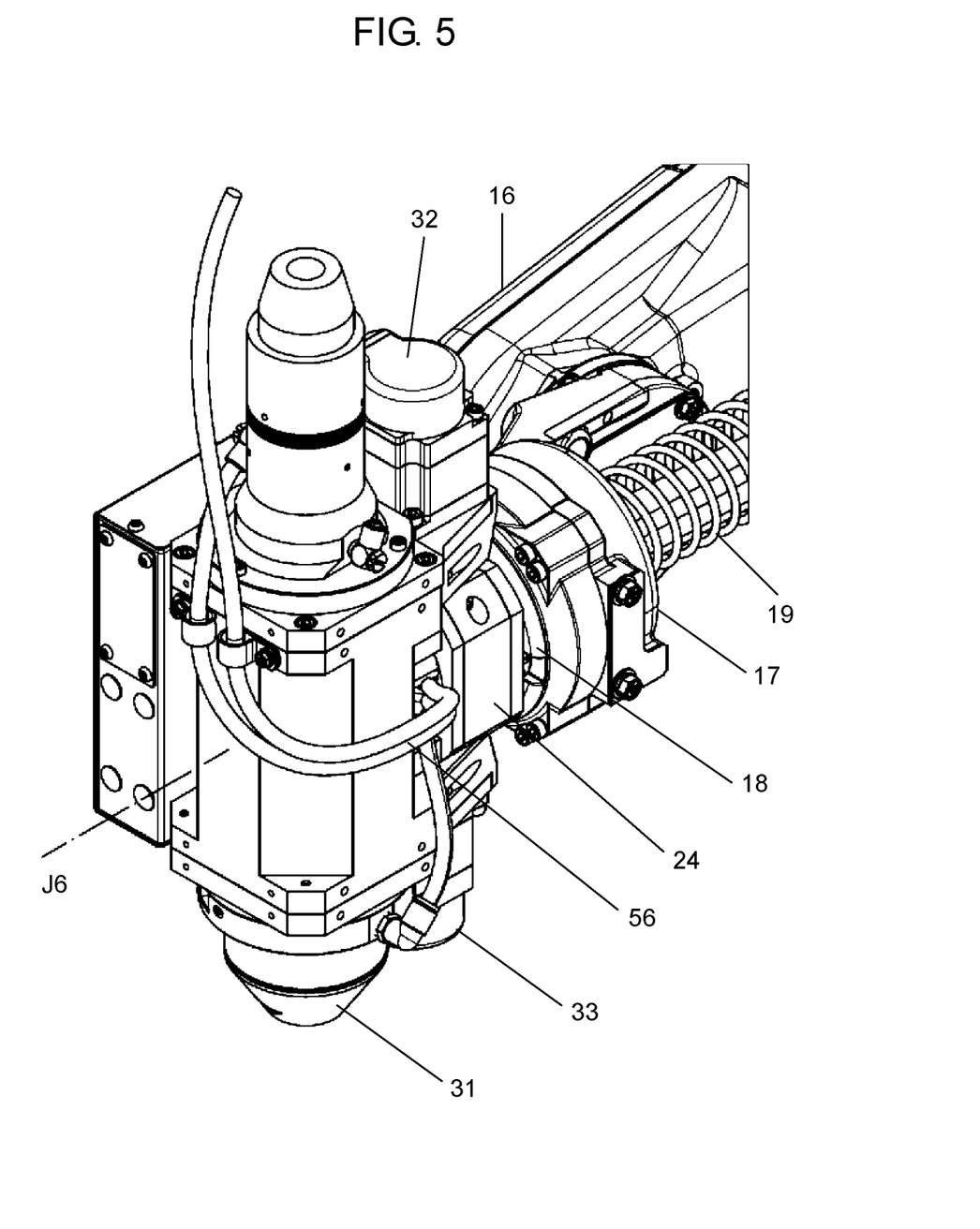
FIG. 5 is a perspective view showing the tip of the wrist of the manipulator in a state where the laser machining head is mounted in accordance with the exemplary embodiment.

A description is provided for the exemplary embodiment of the present disclosure with reference to FIG. 1 through FIG. 5. FIG. 1 is a right side view of laser machining robot 100 that includes manipulator 1, robot controller 51, and laser machining head 31 in accordance with the exemplary embodiment. FIG. 2 is a top view of laser machining robot 100 that includes manipulator 1, robot controller 51, and laser machining head 31 in accordance with the exemplary embodiment. FIG. 3 is a left side view of a wrist of manipulator 1 in a state where laser machining head 31 is mounted in accordance with the exemplary embodiment. FIG. 4 is a perspective view showing the tip of the wrist of manipulator 1 in a state where laser machining head 31 is not mounted in accordance with the exemplary embodiment. FIG. 5 is a perspective view showing the tip of the wrist of manipulator 1 in a state where laser machining head 31 is mounted. Examples of laser machining robot 100 include a laser welding robot and a laser cutting robot.

<Structure and Operation of Laser Machining Robot 100>

As shown in FIG. 1 and FIG. 2, laser machining robot 100 of the exemplary embodiment includes manipulator 1, robot controller 51, and laser machining head 31. A laser beam output from a laser oscillation device (not shown) is input to laser machining head 31. Laser machining head 31 radiates the laser beam to a workpiece (not shown) while changing the radiation position of the laser beam. Laser machining head 31 is mounted to the tip of manipulator 1. Robot controller 51 controls the operation of manipulator 1 and the operation of laser machining head 31 based on the operation program stored in robot controller 51.

As shown in FIG. 1, manipulator 1 is of a six-axis vertical multi-articulated type and includes base 12, rotary part 13, lower arm 14, upper arm 15, and a wrist part. The wrist part includes at least first wrist arm 16, second wrist arm 17, and wrist flange 18. That is, manipulator 1 is roughly classified into seven parts: base 12, rotary part 13, lower arm 14, upper arm 15, first wrist arm 16, second wrist arm 17, and wrist flange 18. In six connectors for connecting these parts, the parts can rotate around the rotating axes. Laser machining head 31 is mounted to the tip portion of manipulator 1. Laser machining head 31 is moved by manipulator 1, and laser machining such as welding and cutting is performed using the laser beam emitting from laser machining head 31.

Next, a specific structure of manipulator 1 is described.

Base 12 is fixed to the installation surface on which manipulator 1 is installed.

Rotary part 13 is disposed rotatably with respect to base 12, and rotates around rotating axis J1 (a first rotating axis).

Rotating axis J1 is an axis orthogonal to the installation surface and is a vertical axis in FIG. 1.

Lower arm 14 is disposed at one end rotatably with respect to rotary part 13 and rotates around rotating axis J2 (a second rotating axis). Rotating axis J2 is an axis parallel to the installation surface and is an axis perpendicular to rotating axis J1. Rotating axis J2 is an axis perpendicular to the plane of FIG. 1. That is, lower arm 14 rocks in a back and forth direction (right and left direction in FIG. 1) around rotating axis J2.

Upper arm 15 is disposed at one end rotatably with respect to lower arm 14 and rotates around rotating axis J3 (a third rotating axis). Rotating axis J3 is an axis parallel to rotating axis J2 and is an axis perpendicular to rotating axis J1. Rotating axis J3 is an axis perpendicular to the plane of FIG. 1. That is, upper arm 15 rocks in the vertical direction (vertical direction in FIG. 1) around rotating axis J3.

Lower arm 14 rocks also in the vertical direction and upper arm 15 rocks also in the left and right direction. The major operation directions are those described above.

The wrist part includes first wrist arm 16, second wrist arm 17, and wrist flange 18, and further, as shown in FIG. 4, at least intermediate member 23.

First wrist arm 16 is disposed at one end rotatably with respect to upper arm 15 and rotates around rotating axis J4 (a fourth rotating axis). Rotating axis J4 is an axis perpendicular to rotating axis J3, and is a horizontal axis in FIG. 1. Since the main axis of first wrist arm 16 substantially corresponds to rotating axis J4, first wrist arm 16 performs a twisting operation.

Second wrist arm 17 is disposed at one end rotatably with respect to first wrist arm 16 and rotates around rotating axis J5 (a fifth rotating axis). Rotating axis J5 is an axis perpendicular to rotating axis J4, and is an axis perpendicular to the plane of FIG. 1. That is, second wrist arm 17 rocks mainly in the vertical direction (in the vertical direction in FIG. 1) around rotating axis J4.

Wrist flange 18 is disposed at the tip of second wrist arm 17 rotatably with respect to second wrist arm 17 and rotates around rotating axis J6 (a sixth rotating axis). Rotating axis J6 is an axis perpendicular to rotating axis J5 and is an axis in the left and right direction in FIG. 1. Since the main axis of wrist flange 18 substantially corresponds to rotating axis J6, wrist flange 18 performs a twisting operation. That is, laser machining head 31 mounted to wrist flange 18 is rotated.

As shown in FIG. 1 and FIG. 2, upper arm 15 has hollow part 21 (a first hollow part) through which a cable, for example, can be threaded in the direction of rotating axis J4. As shown in FIG. 2, first wrist arm 16 has hollow part 25 (a second hollow part) through which a cable, for example, can be threaded in the direction of rotating axis J4.

As shown in FIG. 4, each of second wrist arm 17 and wrist flange 18 has a hollow part through which a cable, for example, can be threaded so as to include rotating axis J6 in the direction of rotating axis J6.

As shown in FIG. 4, intermediate member 23 is mounted to wrist flange 18. Intermediate member 23 has a through-hole so that one side is open to the hollow part of wrist flange 18 and the other side is open to the opposite direction in rotating axis J6. The through-hole of intermediate member 23 is the path of a cable (wiring, for example) guided from manipulator 1 to laser machining head 31.

As shown in FIG. 5, laser machining head 31 is mounted to the face on the opposite side of wrist flange 18 of intermediate member 23.

<Structure and Operation of Laser Machining Head 31>

Laser machining head 31 includes an optical member (not shown) for changing the radiation position of a laser beam with respect to a workpiece (scanning the laser beam with respect to the workpiece). Examples of the optical member include a mirror and an inclined parallel plate. In this exemplary embodiment, a description is provided for laser machining head 31 that includes two inclined parallel plates and changes the radiation position of the laser beam by rotating two inclined parallel plates.

Laser machining head 31 includes servomotor 32 (a first servomotor) for rotating one inclined parallel plate and servomotor 33 (a second servomotor) for rotating the other inclined parallel plate. The servomotors disposed on rotating axes J1 through J6 of manipulator 1 are of the types same as servomotors 32, 33 and have different output capacities. The term "types same as" herein shows that the driving principle and the mechanism of control method of the servomotors are the same. Servomotors 32, 33 are controlled by robot controller 51 that controls servomotors forming manipulator 1. That is, servomotors 32, 33 disposed on laser machining head 31 and the servomotors forming manipulator 1 share robot controller 51 as a controller. Using the same type of servomotors having only different output capacities in manipulator 1 and laser machining head 31 allows most of the control circuit to be shared and the control of the elements to be linked with each other easily.

Servomotors 32, 33 are biased on one side of laser machining head 31. Laser machining head 31 is mounted to manipulator 1 so that servomotors 32, 33 are positioned on the manipulator 1 side (on the wrist flange side 18). More specifically, in the state where laser machining head 31 is mounted to manipulator 31, as shown in FIG. 5, servomotor 32 and servomotor 33 are disposed above and below intermediate member 23.

The reason for disposing the servomotors in this manner is that operating manipulator 1 in a short tact time needs to increase the acceleration and deceleration speed of the wrist part as much as possible. That is, when relatively heavy servomotors 32 and 33 are disposed on the manipulator side 1, the servomotors are set closer to rotating axis J1, i.e. the rotating axis of whole manipulator 1; thereby the inertia is reduced.

<Connection Between Robot Controller 51 and Manipulator 1>

In laser machining robot 100 of this exemplary embodiment, manipulator 1 and robot controller 51 are connected with a plurality of cables and hoses as shown in FIG. 1 and FIG. 2. The drive power of the servomotor and the signal of the motor encoder that form manipulator 1 and the drive power of servomotors 32, 33 and the signals of the motor encoders that form laser machining head 31 are transmitted via these cables.

This exemplary embodiment shows an example in which three cables and one hose are used, as shown in FIG. 1 and FIG. 2. In FIG. 1, cables 52, 53 are disposed behind cable 54. In FIG. 2, cooling hose 55 is disposed behind cable 54. Cable 52 (a first cable) is a power supply line for supplying drive power, for example, of servomotors that form manipulator 1. Cable 53 (a second cable) is a signal line for transmitting signals, for example, of motor encoders of servomotors that form manipulator 1. In cable 54 (a third cable), a power supply line for supplying drive power of the servomotors forming laser machining head 31 and a signal line for transmitting signals of the motor encoders are grouped. Cable 54 is also referred to as a motor control line.

Cooling hose 55 (a first cooling hose) supplies and discharges cooling water, for example, for cooling laser machining head 31.

In order to connect cables 52 and 53, cable 54 and cooling hose 55 are guided to the inside of base 12 of manipulator 1 via connecting hole 11 disposed in base 12 of manipulator 1, provided separately from the connecting hole disposed in base 12 of manipulator 1. Cable 54 and cooling hose 55 are led out to rotary part 13 through the inside of base 12 and the inside of rotary part 13 to the outside of rotary part 13.

Cable 54 led out from rotary part 13 is guided along the side face of lower arm 14 to upper arm 15, where cable 54 is connected to battery card 45 disposed on upper arm 15 and supplies electric power to the encoders (not shown) of servomotors 32, 33 forming laser machining head 31. Encoders can record the rotation angles of servomotors 32, 33. Battery card 45 may be disposed in a place other than upper arm 15.

On the other hand, cooling hose 55 is once connected to one end of conversion fitting 43 disposed on lower arm 14. At the other end of conversion fitting 43, cooling hose 56 (a second cooling hose) is connected. The diameter of cooling hose 56 is smaller than the diameter of cooling hose 55. The diameter of cooling hose 56 fits to that of a joint (not shown) disposed on laser machining head 31 for connecting the cooling hose. In this manner, using cooling hose 55 having a large diameter in the portion toward conversion fitting 43 can reduce the burden on the pump (not shown) for delivering cooling water.

Cable 54 and cooling hose 56 are guided to hollow part 21 disposed along rotating axis J4 of upper arm 15 in a state where the positions of these elements are close to each other. Cable 54 and cooling hose 56 go through the inside of hollow part 21 of upper arm 15 and are guided to first wrist arm 16 along rotating axis J4 to first wrist arm 16. Further, cable 54 and cooling hose 56 go through the inside of hollow part 25 provided in first wrist arm 16 and guided to second wrist arm 17. Further, cable 54 and cooling hose 56 go through the inside of the hollow part (not shown) provided in second wrist arm 17 and guided to wrist flange 18. Cable 54 and cooling hose 56 go through the through-hole of intermediate member 23 and led out from the opening of intermediate member 23 in the fitting face of laser machining head 31. Cable 54 is connected to servomotors 32, 33. Cooling hose 56 is connected to the joint disposed in laser machining head 31 for connecting the cooling hose.

Since two servomotors constitute laser machining head 31, two cables 54 as motor control lines may be provided.

From hollow part 21 provided in upper arm 15 to the hollow part (not shown) of second wrist arm 17 via hollow part 25 of first wrist arm 16, coil spring 19 is provided as a cable guide for protecting cable 54 and cooling hose 56. Coil spring 19 is fixed by fixing member 48 (a first fixing member) disposed on upper arm 15 as shown in FIG. 1, and by fixing member 24 (a second fixing member) disposed on intermediate member 23 as shown in FIG. 4. Cable 54 and cooling hose 56 go through the inside of coil spring 19 and are protected by coil spring 19. The cable guide is not limited to a coil spring and may be a pipe capable of stretching or bending.

Coil spring 19 can prevent cable 54 and cooling hose 56 from bending when laser machining head 31 rotates along rotating axis J5 and rotating axis J6.

First wrist arm 16 includes protection member 20 as shown in FIG. 3. Protection member 20 prevents cable 54 and cooling hose 56 from vibrating when manipulator 1 operates.

As shown in FIG. 1, a part of cable 54 and a part of cooling hose 55 are fixed to lower arm 14. Thus, in order to guide cable 54, cooling hose 55, and cooling hose 56 from base 12 to upper arm 15 in manipulator 1, a part of the cable and hoses goes through inside manipulator 1 and the other part goes through outside manipulator 1. When cable 54, cooling hose 55, and cooling hose 56 go through outside manipulator 1, these cable and hoses are fixed to lower arm 14. This configuration prevents interference of cable and hoses with peripheral devices, reduces breakage, for example, and increases the operability of manipulator 1.

In the laser welding robot of this exemplary embodiment, in order to prevent adhesion of dirt to the protective glass (not shown) forming laser machining head 31, an air hose for supplying an air jet may be disposed in laser machining head 31 in the same route as those of cooing hoses 55, 56. The air hose may supply a shield gas or assist gas to the laser machining head. Since the air hose is disposed parallel to the cooling hose, the illustration is omitted.

All of three cables 52 through 54 and cooling hose 56 may be grouped into one or any of two or three cables may be grouped into one. As cables 52 through 54, power supply lines and signal lines of servomotors of manipulator 1, or the power supply lines and signal lines of servomotors of laser machining head 31 may be formed in any combination. For instance, only signal lines may be grouped as a cable or only power supply lines may be grouped as a cable.

INDUSTRIAL APPLICABILITY

The present disclosure can reduce the number of cables between a manipulator and a robot controller and reduce the interference between cables disposed in the laser machining robot and the peripheral devices. Thus, the present disclosure is industrially useful as a laser machining robot for performing laser machining.

REFERENCE MARKS IN THE DRAWINGS

1 Manipulator
11 Connecting port
12 Base
13 Rotary part
14 Lower arm
15 Upper arm
16 First wrist arm
17 Second wrist arm
18 Wrist flange
19 Coil spring
20 Protection member
21, 25 Hollow part
23 Intermediate part
24, 48 Fixing member
31 Laser machining head
32, 33 Servomotor
43 Conversion fitting
45 Battery card
51 Robot controller
52, 54 Cable
55, 56 Cooling hose
J1-J6 Rotating axis
100 Laser machining robot

The invention claimed is:
1. A laser machining robot comprising:
a manipulator;
a robot controller for controlling operation of the manipulator;

a laser machining head mounted to the manipulator and emitting a laser beam, and a first cable connecting the manipulator to the robot controller for operating the manipulator, wherein the laser machining head includes a servomotor for changing the radiation position of the laser beam, and drive of the servomotor is controlled by the robot controller, and wherein the manipulator includes a wrist part for mounting the laser machining head, the wrist part includes a first wrist arm, a second wrist arm, and a wrist flange, the laser machining head is rotatably mounted to the wrist flange, the wrist flange is rotatably mounted to the second wrist arm, the second wrist arm is rotatably mounted to the first wrist arm, the first wrist arm, the second wrist arm, and the wrist flange include a hollow part, the laser machining robot further includes a motor control line connecting the servomotor to the robot controller for controlling the servomotor, the motor control line comprising a power supply line for supplying drive power of the servomotor and a signal line for transmitting signals of a motor encoder, and the motor control line extends through the hollow part provided in the first wrist arm, the second wrist arm, and the wrist flange, and a cooling water hose connected to the laser machining head for supplying and discharging cooling water, wherein a diameter of the cooling water hose on a side of the laser machining head is smaller than a diameter of the cooling water hose on an omosite side of the laser machining head.

2. The laser machining robot of claim 1, wherein the motor control line and the first cable are grouped into one.

3. The laser machining robot of claim 2, wherein a part of the motor control line extends through an inside of the manipulator.

4. The laser machining robot of claim 2, wherein each of the servomotor and the motor control line is one of a plurality of servomotors and motor control lines, and the number of servomotors is identical to the number of the motor control lines.

5. The laser machining robot of claim 2, further comprising a second cable connecting the manipulator to the robot controller for controlling operation of the manipulator, wherein one of the first cable and the second cable is a power supply line for supplying electric power to the manipulator, and an other of the first cable and the second cable is a signal line for controlling operation of the manipulator.

6. The laser machining robot of claim 1, wherein the laser machining head is mounted to the manipulator so that the servomotor is disposed on a side of the manipulator.

7. The laser machining robot of claim 1, further comprising:

an air hose connected to the laser machining head and supplying a shield gas, wherein the manipulator is of a vertical multi-articulated type having six rotating axes, the manipulator includes a cable guide disposed along a fourth rotating axis and a sixth rotating axis from an installation surface of the manipulator, and the motor control line, the cooling water hose, and the air hose are disposed in the cable guide.

8. The laser machining robot of claim 7, wherein the cable guide is a coil spring.

9. The laser machining robot of claim 1, wherein the cooling water hose includes a first cooling water hose, and a second cooling water hose connected to the first cooling water hose at one end and connected to the laser machining head at an other end, and a diameter of the second cooling water hose is smaller than a diameter of the first cooling water hose.

10. The laser machining robot of claim 1, wherein the manipulator is operated by a servomotor of a type identical to that of the servomotor but having a different output capacity.

11. The laser machining robot of claim 9, wherein the second cooling water hose extends through the hollow part provided in the first wrist arm, the second wrist arm, and the writs flange.

* * * * *